(12) United States Patent
Steiner et al.

(10) Patent No.: US 9,878,517 B2
(45) Date of Patent: Jan. 30, 2018

(54) VOLUMINOUS NONWOVEN COMPOSITE AND METHOD FOR PRODUCING SAME

(71) Applicant: MONDI ASCANIA GMBH, Aschersleben (DE)

(72) Inventors: Ulrich Steiner, Wetzikon (CH); Tarek Fahmy, Polle (DE); Marko Fleck, Aschersleben (DE)

(73) Assignee: MONDI ASCANIA GMBH, Aschersleben (DE)

( * ) Notice: Subject to any disclaimer, the term of this patent is extended or adjusted under 35 U.S.C. 154(b) by 9 days.

(21) Appl. No.: 15/026,005

(22) PCT Filed: Oct. 15, 2014

(86) PCT No.: PCT/DE2014/100363
§ 371 (c)(1),
(2) Date: Mar. 30, 2016

(87) PCT Pub. No.: WO2015/055177
PCT Pub. Date: Apr. 23, 2015

(65) Prior Publication Data
US 2016/0243788 A1    Aug. 25, 2016

(30) Foreign Application Priority Data

Oct. 18, 2013 (DE) ........................ 10 2013 111 499

(51) Int. Cl.
*B32B 5/26* (2006.01)
*D04H 1/495* (2012.01)
(Continued)

(52) U.S. Cl.
CPC ............... *B32B 5/26* (2013.01); *B32B 3/28* (2013.01); *B32B 5/022* (2013.01); *B32B 7/08* (2013.01);
(Continued)

(58) Field of Classification Search
None
See application file for complete search history.

(56) References Cited

U.S. PATENT DOCUMENTS 3,493,462 A    2/1970   Bunting, Jr. et al.
5,701,643 A    12/1997  Fleissner
(Continued)

FOREIGN PATENT DOCUMENTS

DE    300 30 120 T2    2/2007
EP    0 751 249 A2     1/1997
(Continued)

OTHER PUBLICATIONS

ISO 1144, Textiles—Universal system for designating linear density (Tex System), First edition—Dec. 15, 1973, 9 pages.
(Continued)

*Primary Examiner* — David Sample
*Assistant Examiner* — Donald M Flores, Jr.
(74) *Attorney, Agent, or Firm* — Collard & Roe, P.C.

(57) ABSTRACT

A voluminous nonwoven composite includes a first layer of melt spun endless filaments, which are randomly deposited, and a second layer of crimped staple fibers and a method produces same. The endless filaments have a fineness of 0.8 to 1.8 dtex, preferably of ≤1.3 dtex, particularly preferably of 1.0 to 1.2 dtex, the crimped staple fibers have a fineness of 2.2 to 15 dtex, preferably of 4 to 10 dtex, and the layers are stabilized and intimately connected with one another exclusively by water jets, to form the voluminous nonwoven composite.

28 Claims, 8 Drawing Sheets (51) Int. Cl.
*D04H 3/007* (2012.01)
*B32B 7/08* (2006.01)
*D04H 5/03* (2012.01)
*B32B 3/28* (2006.01)
*B32B 5/02* (2006.01)
*D04H 1/492* (2012.01)
*D04H 3/011* (2012.01)
*D04H 3/11* (2012.01)

(52) U.S. Cl.
CPC ............. *D04H 1/492* (2013.01); *D04H 1/495* (2013.01); *D04H 3/007* (2013.01); *D04H 3/011* (2013.01); *D04H 3/11* (2013.01); *D04H 5/03* (2013.01); *B32B 2250/02* (2013.01); *B32B 2250/20* (2013.01); *B32B 2262/0276* (2013.01); *B32B 2307/726* (2013.01); *B32B 2555/02* (2013.01); *D10B 2331/04* (2013.01); *D10B 2401/10* (2013.01); *D10B 2509/026* (2013.01)

(56) References Cited

U.S. PATENT DOCUMENTS

| | | | |
|---|---|---|---|
| 7,838,099 | B2 | 11/2010 | Curro et al. |
| 7,998,889 | B2 * | 8/2011 | Stralin ................... D04H 1/492 28/103 |
| 2002/0157766 | A1 * | 10/2002 | Vuillaume ........... D04H 1/4258 156/180 |
| 2003/0021970 | A1 | 1/2003 | Noelle |
| 2003/0199219 | A1 * | 10/2003 | Hayes ..................... D04H 1/70 428/141 |
| 2013/0104330 | A1 | 5/2013 | Dorsey et al. |
| 2014/0115838 | A1 | 5/2014 | Kirsch et al. |

FOREIGN PATENT DOCUMENTS

| | | |
|---|---|---|
| EP | 1 275 764 A1 | 1/2003 |
| EP | 1 706 527 B1 | 4/2009 |
| EP | 2 116 645 A1 | 11/2009 |
| EP | 1 576 222 B1 | 4/2011 |
| EP | 2 505 707 A1 | 10/2012 |
| JP | H05 209353 A | 8/1993 |
| WO | 01/53590 A1 | 7/2001 |
| WO | 03/001962 A1 | 1/2003 |
| WO | 2008/147264 A1 | 12/2008 |

OTHER PUBLICATIONS

DIN 60905, Part 1: "Tex-System; principles", Part 1, Dec. 1985, 6 pages.
DIN EN ISO 1973:1995, Textile fibres, Determination of linear density by gravimetric method and vibroscope method, Nov. 1995, 9 pages.
International Search Report of PCT/DE2014/100363, dated Feb. 12, 2015.

* cited by examiner

VOLUMINOUS NONWOVEN COMPOSITE AND METHOD FOR PRODUCING SAME

CROSS REFERENCE TO RELATED APPLICATIONS

This application is the National Stage of PCT/DE2014/100363 filed on Oct. 15, 2014, which claims priority under 35 U.S.C. § 119 of German Application No. 10 2013 111 499.7 filed on Oct. 18, 2013, the disclosure of which is incorporated by reference. The international application under PCT article 21(2) was not published in English.

The invention relates to a voluminous nonwoven composite comprising a first layer of melt-spun endless filaments, laid down in entangled manner, and a second layer of crimped staple fibers, as well as to a method for the production of the same.

In the production of hygiene articles, for example baby diapers, different nonwoven fabrics, also referred to as nonwovens or nonwoven materials, are used, depending on the functionality. The nonwoven fabrics can fundamentally be divided into two groups, namely thin nonwoven fabrics, on the one hand, and voluminous nonwoven fabrics, on the other hand.

The thin nonwoven fabrics are those having a thickness of about 0.2 mm and a weight per surface area of about 10 to 15 g/m², resulting in a density of about 0.05 to 0.075 g/cm³. The pore size of such nonwovens generally lies at 50 μm. Thin nonwoven fabrics are predominantly produced from thermoplastic endless fibers that are laid down in entangled manner. In what is called the spun-bond method, such nonwovens are generally produced from polypropylene. The extruded fibers, laid down onto a screen belt in an air stream, are melted to one another at discrete locations, by means of calendering, under heat and pressure. The nonwoven is given its strength in this way, and is compressed to its final thickness during this process.

Thin nonwovens are used as a cover nonwoven of the absorbent body of a diaper, for example. In order to accelerate the passage of liquid, such nonwovens are hydrophilized by means of application of a wetting agent. Thin nonwovens that sheathe the absorbent core itself, in order to give it stability, are also finished in this manner.

In contrast, for use as leakage protection at the side, hydrophilization is undesirable. Usually, in this case, the liquid-repelling effect of the nonwoven is increased by means of the introduction of microfibers having diameters in the micrometer range (melt-blown fibers), thereby causing the pore size to decrease even more. Such water-repelling nonwovens are also glued onto the watertight film that serves as leakage protection, from the outside, in order to give it a textile feel, what is called a "textile backsheet."

If nonwovens having a heavier weight are produced according to the spun-bond methods mentioned above, for example using a Reicofil system from the Reifenhäuser company, the thickness increases only slightly, because the density of the nonwoven increases in the calendering process. A nonwoven having a weight per surface area of 45 g/m² has a thickness of only about 0.3 mm, for example, and a density of 0.15 g/cm³. Voluminous, thicker nonwovens having densities below 0.1 g/cm³ therefore cannot be produced in this manner, by means of increasing the weight per surface area. However, they are needed for a broad range of applications.

Voluminous nonwovens, as they are used in the hygiene sector, are those having a weight per surface area of 20 to 60 g/m². These already have a thickness of more than 0.3 mm in the aforementioned low range of weight per surface area. The density of such nonwovens lies below 0.1 g/cm³ in the entire aforementioned range of weight per surface area.

Corresponding to their low density, the average pore size of such voluminous nonwovens is greater than that of thinner nonwovens, and usually amounts to more than 0.1 mm.

Such voluminous nonwovens are used, for example, as a nonwoven layer between a diaper cover nonwoven and the actual absorbent body, as what is called an "acquisition layer." Liquid that passes through the cover nonwoven is temporarily stored in the voluminous nonwoven, because the absorbent body, which consists, for the most part, of super-absorbent polymer powder, needs a certain amount of time to develop its absorbent capacity.

If the absorbent body is designed in such a manner that it cannot give off any particles, for example by being sheathed with a thin nonwoven, a paper or by means of the addition of adhesive, it is possible to do entirely without the outer, thin cover nonwoven, and a voluminous nonwoven can be used directly as what is called a "top sheet." It then simultaneously fulfils the function of the "acquisition layer."

In another application, voluminous nonwovens are also used as part of a hook-and-loop closure, and there form the loop-bearing counter-piece to the hook-bearing part of the hook-and-loop closure. The aforementioned counter-piece is also referred to as a "landing zone." The mushroom-shaped hooks usually have a length of 0.3-0.5 mm, wherein their thickened heads, having a diameter of 0.2-0.35 mm, hook into the endless fibers that form loops when they dip into the voluminous nonwoven.

When used as a "landing zone," voluminous nonwovens are often provided with a surface relief, for example waves in the longitudinal direction. This has the advantage that the hooks settle even more tightly in the nonwoven when tensile stress occurs in the transverse direction, as it occurs in diaper closures.

For the production of voluminous nonwovens, nonwovens composed of crimped staple fibers can be needled using water jets. Such a nonwoven is disclosed in U.S. Pat. No. 3,493,462, for example, and is known under the designation "Sontara" of the DuPont company. A disadvantage of such nonwovens consists in their low friction-wear resistance and the related easy loosening of fibers, thereby making this product unsuitable for uses as a "landing zone" of a hook-and-loop closure.

An attempt was therefore made to produce voluminous nonwovens from endless filaments, because these demonstrate great strength and good friction-wear properties.

However, calendering is not a possibility for stabilization of endless filaments laid down in entangled manner, using the spun-bond method, because the nonwoven would be compressed too greatly by the pressure between the hot steel rolls.

Instead, here, too, water-jet stabilization is used, because in this process, the nonwoven volume is maintained and only looping of the filaments into one another takes place.

From EP 2505707 A1, it is known that the degree of looping and thereby the density of a nonwoven composed of endless filaments can be adjusted by means of variation of the pressure of the water jets during water-jet needling, and in this way, a nonwoven can be obtained that is suitable as a "landing zone" of a hook-and-loop closure. However, it is disadvantageous in this regard that in the case of variation of the process parameters, the mechanical properties of the nonwoven, for example the tear forces, change negatively.

This is particularly due to the fact that endless filaments, as such, are difficult to loop into one another.

From U.S. Pat. No. 7,998,889 B2, it is known that in a wet laying process, non-crimped staple fibers of up to 4 dtex are passed to a nonwoven composed of entangled endless filaments of up to 4 dtex, wherein then, a nonwoven having an average pore size of 70 μm is obtained by means of water-jet needling. The maximal pore size lies at 150 μm, and the density of such nonwovens amounts to approximately 0.1 g/cm$^3$. Great volume is supposed to be achieved by means of the use of relatively thick fibers, which are, however, therefore difficult to needle.

US 2013/0104330 A1 discloses a two-sided or different-sided nonwoven fabric composed of a first amount of fibers, which is hydraulically needled to a web composed of a second amount of fibers, wherein the two-sided nonwoven fabric has a first surface that predominantly has the first amount of fibers, and an opposite second surface that predominantly comprises the second amount of fibers. A disadvantage of this is that when using the nonwoven fabric in or for a product, for example a diaper, the orientation of the surfaces or of the bottom and top side of the nonwoven fabric has been established.

Furthermore, it is known from US 2002/0157766 A1 and from DE 600 30 120 T2, which belongs to the patent family, to needle crimped staple fibers to a nonwoven composed of endless filaments, using water jets. Mechanical pre-compacting of the complex composed of crimped staple fibers and nonwoven composed of endless filaments, by means of cold pressing, is supposed to ensure very great strength in this connection, wherein the staple fibers are used to obtain a textile feel. Thickness and density of the nonwoven fabric do not play any role. The nonwoven fabric is supposed to demonstrate mechanical properties equivalent to those of spun-bond nonwovens stabilized by means of calendering with heat.

WO 01/53590 A1 describes a method for the production of a composite nonwoven composed of two webs, namely of an upper web and a lower web, which are preferably connected with one another by means of water-jet stabilization. The upper web is a web composed of short, non-crimped cellulose fibers, which is applied to the lower web, composed of melt-spun endless filaments, by means of a wet-laying or air-laying process. Mechanical pre-compacting after application of the top web to the lower web is proposed. The endless filaments have a fineness of less than 1.6 dtex, preferably between 0.55 and 1.3 dtex. The weight per surface area of the lower web amounts to less than 25 g/m$^2$. Because the cellulose fibers used are non-crimped and furthermore very short, a highly compacted composite nonwoven is formed, in total.

A relief can be embossed onto a nonwoven in an additional work step, for example by means of deformation in corresponding tools composed of roll pairs. The volume effective for functionality can thereby be increased once again, as disclosed in U.S. Pat. No. 7,838,099 B2.

The invention is based on the task of eliminating the disadvantages mentioned above and of making available and producing an improved voluminous nonwoven composite in simple and efficient manner. The invention is furthermore based on the task of making available and producing a voluminous nonwoven composite that has a relief that can be configured in simple and efficient manner.

This task is accomplished, in the case of a voluminous nonwoven composite as described herein, as well as, in the case of a method for the production of a voluminous nonwoven composite as described herein. Further developments and advantageous embodiments of the invention are described herein.

The voluminous nonwoven composite, which has a first layer of melt-spun endless filaments, laid down in entangled manner, and a second layer of crimped staple fibers, is characterized, according to the invention, in that a) the endless filaments have a fineness of 0.8 to 1.8 dtex, preferably of ≤1.3 dtex, particularly preferably of 1.0 to 1.2 dtex, b) the crimped staple fibers have a fineness of 2.2 to 15 dtex, preferably of 4 to 10 dtex, and C) the layers are stabilized and intimately connected with one another exclusively by means of water jets, to form the voluminous nonwoven composite.

Because of the fact that the at least one layer of melt-spun, thin endless filaments laid down in entangled manner, as mentioned above, in other words a layer of an endless fiber nonwoven having great fineness or a small dtex, is water-jet-stabilized or water-jet-needled and intimately connected with the aforementioned at least one layer of carded, crimped, thick staple fibers, an improved voluminous nonwoven composite is obtained and made available in simple and efficient manner.

The term "intimately," which is easily understood by a person skilled in the art of the present application sector, should be understood to mean that the connection of the said layers results in an extensively homogeneous nonwoven composite or nonwoven material. In other words, the aforementioned endless filaments and staple fibers are looped into one another, after water-jet stabilization, in such a manner that the original, multi-layer structure has been lost. When the nonwoven fabric is used in or for a product, for example in or for a diaper, the orientation of the surfaces or of the bottom and top side of the nonwoven composite is therefore unimportant, and this is advantageous. Separation of the voluminous nonwoven composite into the original layers is not possible.

The fineness of endless filaments and staple fibers represents a measure of their thickness or diameter. The smaller the diameter of such a structure, the finer it is or the greater is its fineness. The fineness can be indicated as length-related mass. Such weight numbering indicates the ratio of mass or weight per length, particularly according to the Tex system mentioned in ISO 1144 and DIN 60905, Part 1: "Tex-System; Fundamentals." Tex is a unit and the basic variable of the Tex system. 1 tex corresponds to 1 gram per 1000 meters. 1 dtex (decitex) corresponds to 0.1 tex or 1 gram per 10,000 meters, and 1 tex corresponds to 10 dtex. The greater the tex number, the coarser the endless filaments or staple fibers, i.e. the greater their diameter.

According to the invention, what is called the titer (dtex) of the endless filaments and staple fibers is determined according to DIN EN ISO 1973:1995-12, wherein the standardized vibroscope method standardized in this document is used. Using this method, the fineness of the individual fibers can be determined, if they can put into sufficient vibration by means of an external exciter frequency forced on them. Because each fiber possesses a fineness-related inherent frequency, the fiber fineness Tt in dtex can be calculated after determination of this frequency.

In water-jet stabilization or water-jet needling, the thin endless filaments of the first layer loop into the staple fibers of the second layer, which, as such, are difficult to needle, and a nonwoven composite that is intimately connected with one another is formed. The strength is achieved by means of the endless filaments, whereas the volume is derived from the thick, crimped fibers that are bound in.

It can be advantageous if the second layer contains not only the one crimped staple fibers but also, in addition, other crimped staple fibers having a fineness from 1.2 to 2.1 dtex, wherein the crimped staple fibers consist of a mixture of 20 to 99 wt.-% of the one staple fibers and 1 to 80 wt.-% of the other staple fibers.

Because of the fact that staple fibers that are less thick are also mixed in with the thick staple fibers, even better integration of the thick staple fibers into the nonwoven composite is achieved. The staple fibers that are less thick act as a connection between the endless filaments and the thick staple fibers, which give the nonwoven composite the required volume by means of their stiffness and crimping.

It can be advantageous if the staple fibers have a length of ≥2.5 cm, preferably up to 10 cm, particularly preferably up to 5 cm.

It can be advantageous if the density of the nonwoven composite amounts to ≤0.1 $g/cm^3$, preferably 0.04 to 0.1 $g/cm^3$.

The density of the nonwoven composite results from weight per surface area of the nonwoven composite divided by the thickness of the nonwoven composite. The weight per surface area is determined according to WSP 1.30.1 (09). The thickness is determined according to WSP 120.1 (09).

It can be practical if the nonwoven composite has pores having a diameter of ≤0.4 mm, preferably of 0.2 mm to 0.4 mm.

The pore size of the nonwoven composite is determined using the Autoporosimeter from the TRI/Princeton company, if the pores have a size <200 μm.

If the pores have a pore size ≥200 μm, the measurement is carried out as follows: The nonwoven composite is clamped into a current screen testing device AA200 control of the Retsch company, or laid onto a screen. Subsequently, 5 g of glass beads having a predetermined diameter are placed onto the clamped-in nonwoven composite. Then, the nonwoven composite is made to vibrate over a time period of 3 min, at a vibration amplitude of 2 mm. Subsequently, it is determined whether glass beads have trickled through the nonwoven composite. If an amount of at least 1.5%, preferably of at least 3%, particularly preferably of at least 5% of the amount weighed in passes through the nonwoven composite, the latter has pores having a pore size that at least correspond to the diameter of the glass beads. The largest pore is indicated by the largest glass bead that has passed through.

It can be practical if the voluminous nonwoven composite has more than 5, preferably more than 10 pores per $cm^2$ having a diameter of ≥0.2 mm.

It can be advantageous if the nonwoven composite has a weight per surface area of 18 to 80 $g/m^2$, wherein the weight proportion of the endless filaments preferably amounts to 10 to 70%, and the weight proportion of the crimped staple fibers preferably amounts to 30 to 90%. The weight per surface area is determined according to WSP 130.1 (09).

It can be practical if the nonwoven composite has a relief having discrete raised locations or regions, which can be embossed during water-jet stabilization. This embossing is advantageously achieved in that during water-jet stabilization or water-jet needling, a drum with a relief is used, into the indentations of which the nonwoven composite settles, and thereby assumes the structure of the drum.

For embossing of the relief into the nonwoven composite during water-jet needling or water-jet stabilization, the aforementioned thinner, crimped staple fibers having a fineness of 1.2 to 2.1 dtex, as mentioned above, can be advantageous. Because the thick staple fibers have little mobility in the water jet, the relief could be defined only unclearly. In contrast, the thinner staple fibers are more easily movable during water-jet stabilization, and thereby the relief can be seen significantly more clearly in the nonwoven composite.

It can be advantageous if the nonwoven composite has an additional embossing, which can be introduced by means of a thermo-calender and/or ultrasound calender, preferably after water-jet stabilization.

It can be practical if the endless filaments and/or the crimped staple fibers can be passed to water-jet stabilization in an inline process.

It can be advantageous if the layer composed of endless filaments and/or the layer composed of crimped staple fibers are slightly pre-stabilized. Accordingly, the said nonwoven layers of the nonwoven composite according to the invention can be passed to water-jet needling in a slightly pre-stabilized state. The pre-stabilization, for example pre-embossing in point form, is carried out so lightly, in this connection, that the fibers can come loose from these slight connection points or pre-stabilization points again during water-jet needling.

It can be advantageous if the layer composed of endless filaments and/or the layer composed of crimped staple fibers can be passed to water-jet stabilization in an off line process.

It can be practical if the slightly pre-stabilized layers can be produced separately from one another and can then be passed to water-jet stabilization.

It can be advantageous if at least one additional layer of endless filaments and/or staple fibers can be passed to water-jet stabilization.

It can be advantageous if the endless filaments consist of monofilaments or bi-component filaments composed of polypropylene, polyethylene, polyester, polylactide or their copolymers.

It can be advantageous if the staple fibers consist of viscose or cotton or of mono-component or bi-component fibers composed of polypropylene, polyethylene, polyester, polyamide, polylactide or their copolymers.

It can be advantageous if the one crimped staple fibers consist of one material, preferably polypropylene, and the other crimped staple fibers consist of a different material for the other, preferably polyester.

It can be practical if at least some of the endless filaments and/or at least some of the staple fibers have a non-round cross-section and/or are hollow.

The invention furthermore relates to a method for the production of a voluminous nonwoven composite, in which a first layer of melt-spun endless filaments, laid down in entangled manner, which have a fineness of 0.8 to 1.8 dtex, preferably of ≤1.3 dtex, particularly preferably of 1.0 to 1.2 dtex, and a second layer of crimped staple fibers, which have a fineness of 2.2 to 15 dtex, preferably of 4 to 10 dtex, are stabilized and intimately connected with one another exclusively by means of water jets.

It can be practical if the second layer contains not only the one crimped staple fibers but also, in addition, other crimped staple fibers having a fineness from 1.2 to 2.1 dtex, wherein the crimped staple fibers consist of a mixture of 20 to 99 wt.-% of the one staple fibers and 1 to 80 wt.-% of the other staple fibers.

It can be advantageous if a relief having discrete raised locations is embossed during water-jet stabilization.

It can be practical if an additional embossing is carried out by means of a thermo-calender and/or ultrasound calender, after water-jet stabilization.

It can be practical if the endless filaments and/or the crimped staple fibers are passed to water-jet stabilization in an inline process.

It can be advantageous if the layer composed of endless filaments and/or the layer composed of crimped staple fibers are slightly pre-stabilized.

It can be advantageous if the layer composed of endless filaments and/or the layer composed of crimped staple fibers are passed to water-jet stabilization in an offline process.

It can be practical if the slightly pre-stabilized layers are produced separately from one another and then passed to water-jet stabilization.

It can be advantageous if at least one additional layer of endless filaments and/or staple fibers is passed to water-jet stabilization.

Further advantageous embodiments of the invention can also become evident from the exemplary embodiments described below, which are shown in the drawing. In the drawing, the figures show.

Figure 1:
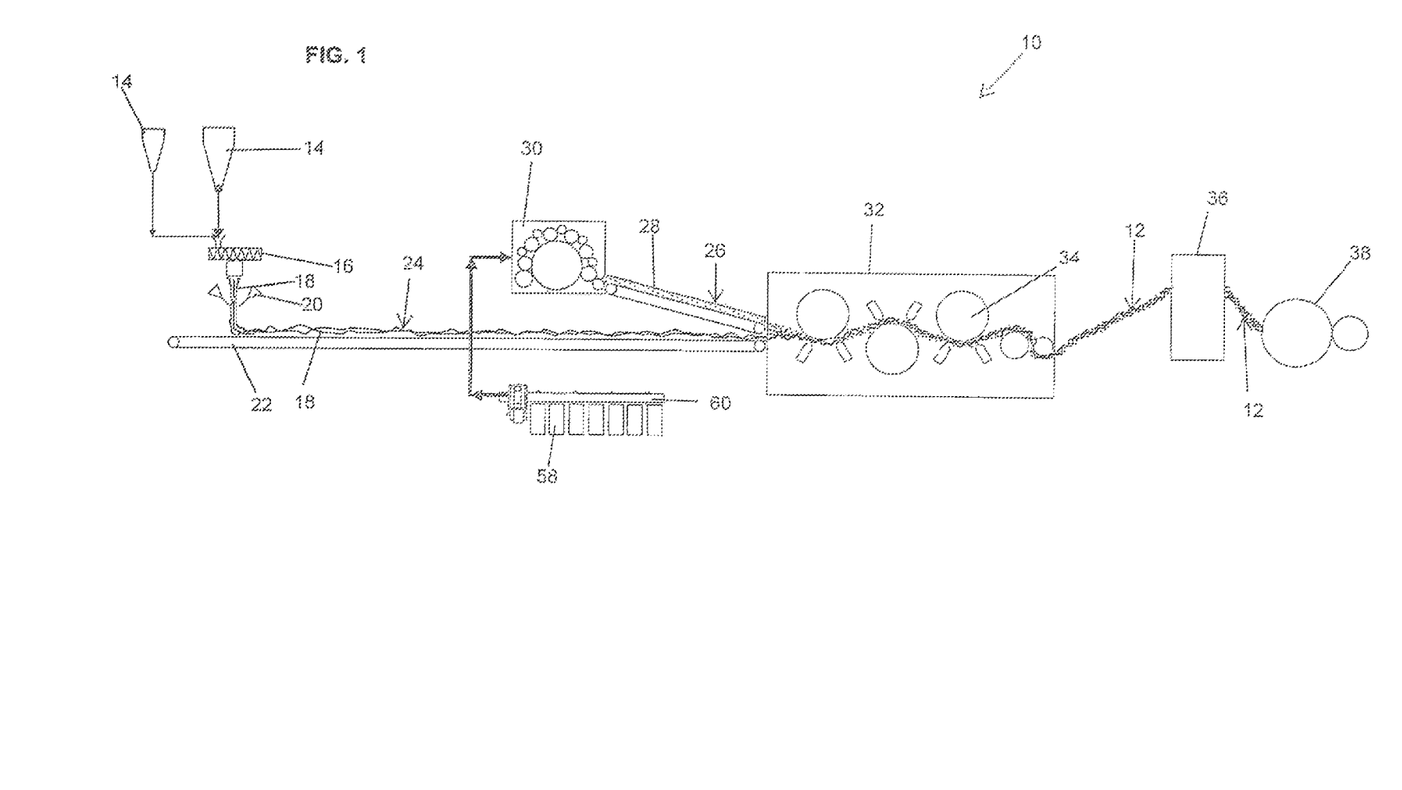
FIG. 1 schematically, an inline production line for the production of a voluminous nonwoven composite according to the invention, FIG. 2 schematically, an offline production line for the production of a voluminous nonwoven composite according to the invention, FIG. 3 schematically, in a top view, the back side of a diaper having a voluminous nonwoven composite according to the invention, FIG. 4 schematically, in cross-section, a voluminous nonwoven composite according to the invention with an embossed relief, FIG. 5 schematically, in cross-section, a diaper having a voluminous nonwoven composite according to the invention, FIG. 6 schematically, in cross-section, a diaper having a voluminous nonwoven composite according to the invention, FIG. 7 microscopically, an 8× magnification of a voluminous nonwoven composite according to the invention, and FIG. 8 microscopically, an 8× magnification of a spun-bond nonwoven according to the state of the art.

FIG. 1 schematically shows an inline production line 10 for the production of a voluminous nonwoven composite 12 according to the invention.

At the start of the method for the production of the voluminous nonwoven composite 12, thermoplastic raw material is passed to the extruders 14, melted, and pressed through a nozzle plate 16. The hot filaments 18 are stretched with blowing air 20, cooled, and laid down onto the transport belt 22 as endless filaments 18.

A layer 26 composed of carded staple fibers 28 is laid down onto this spun-bond nonwoven layer 24.

For this purpose, staple fibers 28 in bale form 58 are transported to a card or carding device 30, using a bale opener 60. There, a uniform nonwoven layer 26 composed of staple fibers 28 is produced, which 26 is applied to the aforementioned spun-bond nonwoven layer 24 without compacting.

In the subsequent water-jet stabilization or water-jet needling 32, the layers 24, 26 are intimately connected with one another, so that the two-layer structure is lost and an approximately homogeneous voluminous nonwoven or nonwoven composite 12 is formed.

In the last step of water-jet needling or water-jet stabilization 32, an embossing can be introduced into the nonwoven composite 12, using a drum 34 provided with a relief.

Subsequently, the nonwoven composite 12 is dried in a dryer 36 and wound into rolls using a winder 38.

Figure 2:
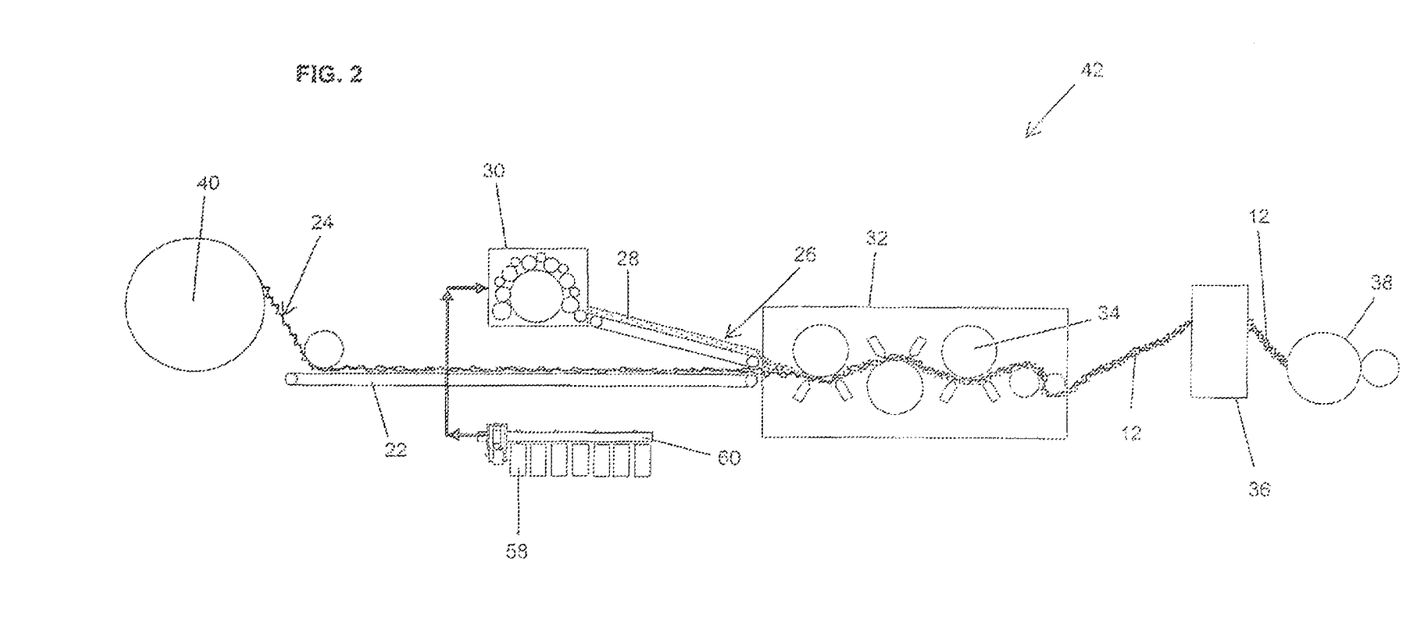

FIG. 2 schematically shows an offline production line 42 for the production of a voluminous nonwoven composite according to the invention.

In this connection, a slightly pre-stabilized spun-bond nonwoven layer 24 is unrolled from a roll 40, without tension, and laid down onto a transport belt 22. A layer 26 composed of carded staple fibers 28 is laid down onto the spun-bond nonwoven layer.

For this purpose, staple fibers 28 in bale form are transported to a card or carding device 30 using a bale opener. There, a uniform nonwoven or a uniform nonwoven layer 26 is produced, which 26 is laid down onto the slightly pre-stabilized spun-bond nonwoven layer 24 without compacting.

In the subsequent water-jet stabilization or water-jet needling 32, the layers 24, 26 are intimately connected with one another, so that the two-layer structure is lost and an approximately homogeneous voluminous nonwoven or nonwoven composite 12 is formed.

In the last step of water-jet needling or water-jet stabilization 32, an embossing can be introduced into the nonwoven composite 12, using a drum 34 with a relief.

Figure 3:
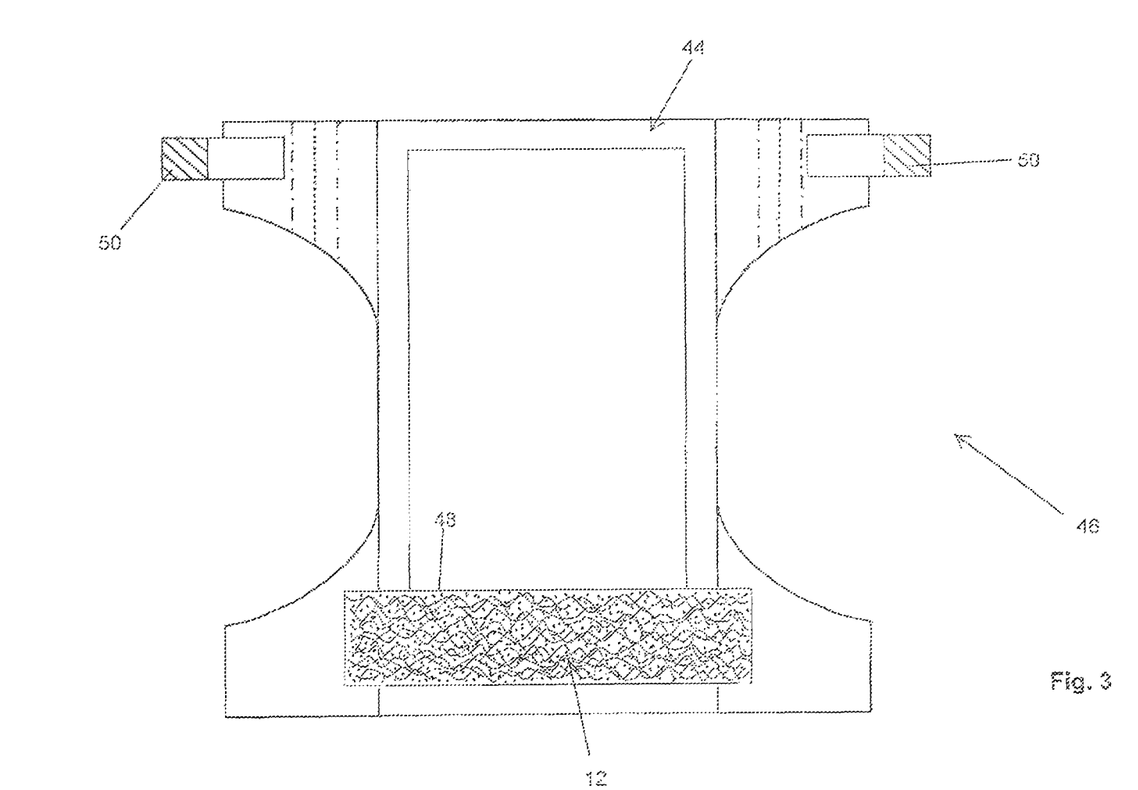

FIG. 3 shows a top view of the back side 44 of a diaper 46, to which the voluminous nonwoven composite 12 according to the invention is applied and serves as what is called the "landing zone" 48 of a hook-and-loop closure. Furthermore, the hook-and-loop tapes 50 that belong to the hook-and-loop closure and have hooks are shown.

Figure 4:
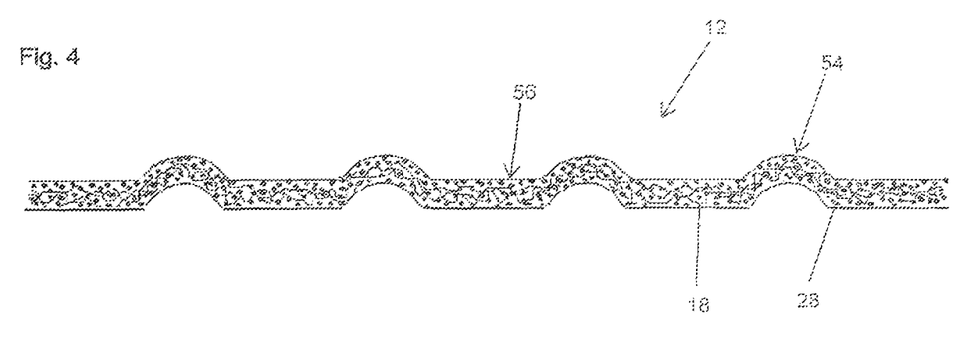

FIG. 4 shows a voluminous nonwoven composite 12 according to the invention, into which a relief 52 is embossed during water-jet stabilization 32. This mountain 54 and valley structure 56 allows the hooks of the hook-and-loop tape 50 of a hook-and-loop closure to hook into the voluminous nonwoven composite particularly well.

Figure 5:
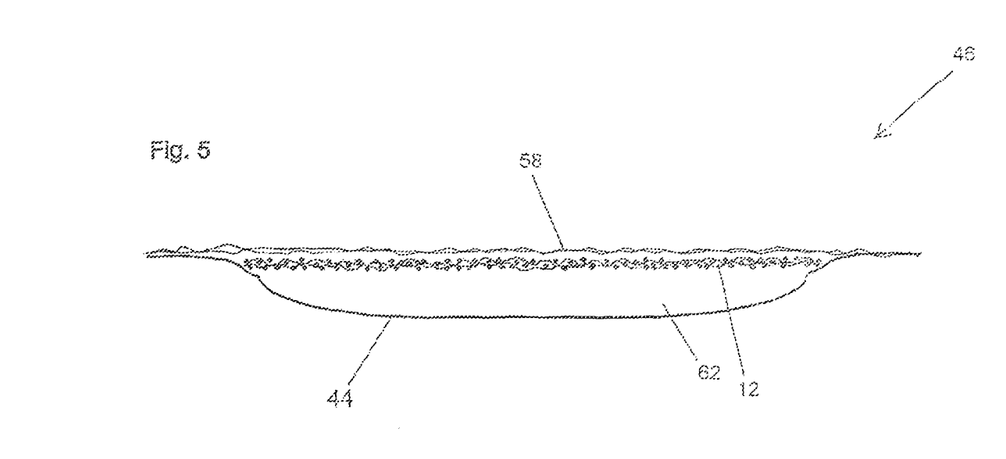

FIG. 5 schematically shows, in cross-section, a diaper 46 having a cover nonwoven composite 58 or top-sheet spun-bond nonwoven and a voluminous nonwoven composite 12 according to the invention disposed underneath it, which functions as what is called an "acquisition layer" and lies on an absorbent body 62 of the diaper 46. The large-pore structure of the nonwoven composite 12 according to the invention allows rapid entry of liquid in this connection.

Figure 6:
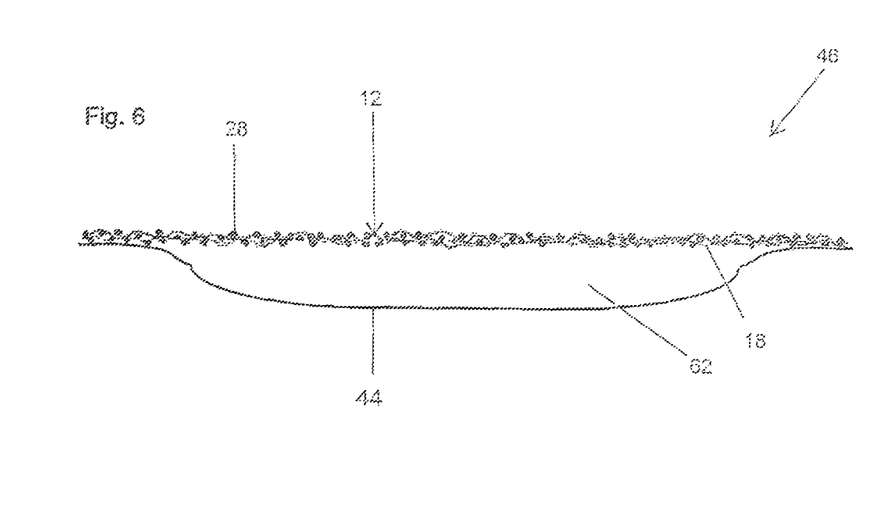

FIG. 6, finally, schematically shows, in cross-section, a diaper 46 having a cover nonwoven 58 composed of a voluminous nonwoven composite 12 according to the invention, which fulfills the function of what is called a "top sheet" having an integrated "acquisition layer." The advantage of such a use consists in that it is not necessary to use two separate nonwoven layers, as described in FIG. 5.

In the following, a voluminous nonwoven composite SC40 according to the invention will be explained in comparison with a known spun-bond nonwoven S40.

The nonwoven composite SC40 is produced using an inline method—corresponding to FIG. 1—and has a weight per surface area of 40 g/m$^2$, comprising a first layer having a weight per surface area of 25 g/m, of melt-spun endless filaments laid down in entangled manner, composed of polypropylene, which have a fineness of 1.2 dtex, and a second layer having a weight per surface area of 15 g/m$^2$, composed of a mixture of crimped staple fibers, wherein the mixture has 65 wt.-% crimped staple fibers composed of polyester, having a fineness of 1.7 dtex, and 35 wt.-% staple fibers composed of polypropylene, having a fineness of 6.6 dtex. The length of the staple fibers amounts to 4 cm. The layers are exclusively stabilized and intimately connected with one another by means of water jets, to form the voluminous nonwoven composite.

The spun-bond nonwoven S40, which comprises only one layer having a weight per surface area of 40 g/m2, has melt-spun endless filaments laid down in entangled manner, composed of polypropylene, having a fineness of 1.2 dtex, wherein the layer is embossed by means of a thermo-calender.

Because of the fact that the mixture of crimped staple fibers has 35 wt.-% crimped staple fibers having a fineness of 6.6 dtex, wherein—as shown in FIG. 1—no compacting takes place before water-jet needling, in advantageous manner, great thickness and a low density of the finished voluminous nonwoven composite is obtained.

In Table 1, different mechanical properties of the voluminous nonwoven composite SC40 according to the invention and of the spun-bond nonwoven S40 are listed.

TABLE 1

| Technical properties | Voluminous composite | Spun-bond nonwoven | Test method |
|---|---|---|---|
| Weight per surface area [g/m²] | 40 | 40 | WSP 130.1 (09) |
| Thickness [mm] | 0.6 | 0.34 | WSP 120.1 (09) |
| Density [g/cm³] | 0.07 | 0.12 | mathematical |
| Air permeability [m³/m²/min] | 180 | 96 | WSP70.1 (08) |
| Largest pore from bubble point measurement [μm] | ≥200 (=outside of measurement range of <200 μm) | 63 | Porosimeter |
| Passage of bead size 0.35 mm [% of amount weighed in] | 6.6 | 0 | Screen test |
| Number of pores >0.2 mm/cm² | 12 | 0 | Microscopic |
| Tear strength, transverse direction [N/5 cm] | 50 | 65 | WSP 110.4 (09) |
| Elongation to tear, transverse direction [%] | 180 | 95 | WSP 110.4 (09) |
| Elongation, transverse direction, at 10 N [%] | 40 | 5 | WSP 110.4 (09) |

The measurement values for thickness, density, pore size, the screen test, and air permeability show that the voluminous nonwoven composite SC40 according to the invention is clearly more open and more voluminous as compared with the spun-bond nonwoven S40, at the same weight per surface area.

Figure 7:
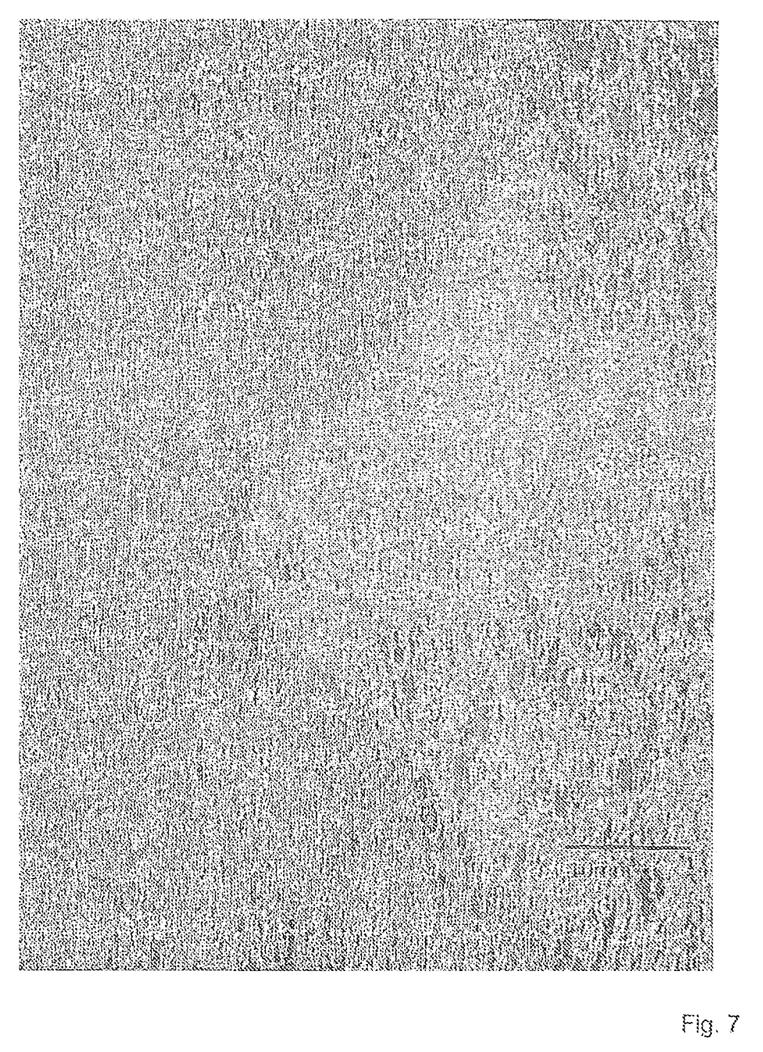
Figure 8:
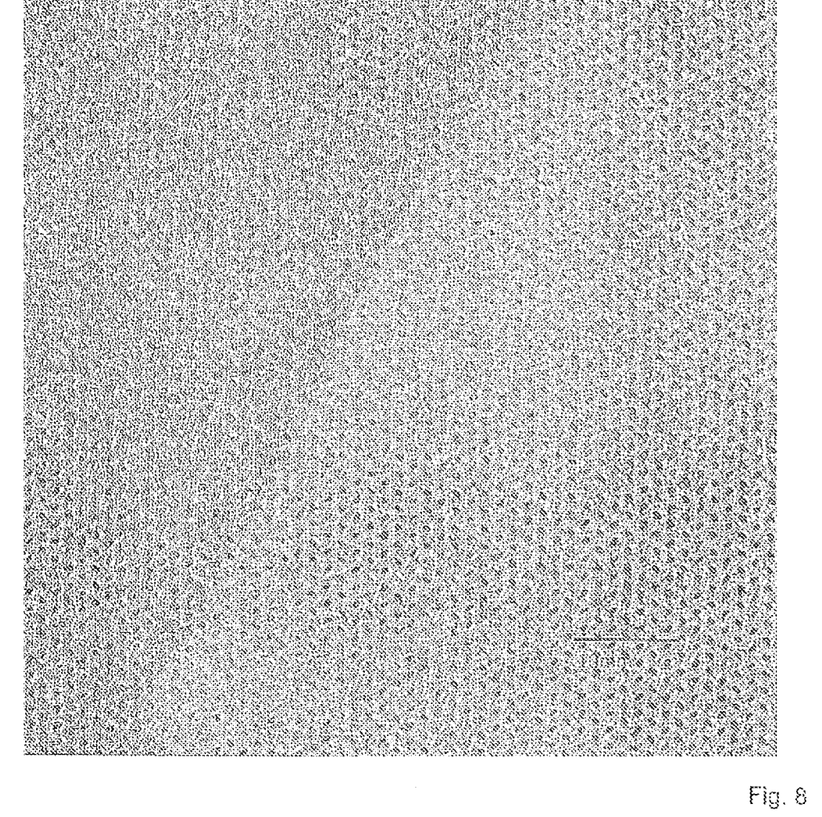

FIGS. 7 and 8 show two microscopic images, magnified 8x, of the voluminous nonwoven composite SC40 and of the spun-bond nonwoven S40, to make the different porosities clear. The voluminous nonwoven composite SC40 according to FIG. 7 shows an obvious greater porosity in the form of the background showing through as black, than the spun-bond nonwoven S40 according to FIG. 8. The black ovals of the spun-bond nonwoven S40 shown in FIG. 8 are not pores but rather thermal embossing points 64.

The mechanical properties of the voluminous nonwoven composite SC40 are also clearly different from those of the spun-bond nonwoven S40. Thus, the tear strength of the voluminous nonwoven composite SC40 is lower, and the elongation is significantly greater than that of the spun-bond nonwoven S40. However, this lack of dimensional stability is advantageous for the stated areas of use. As shown in FIG. 3, the voluminous nonwoven composite SC40 forms the counter-piece having loops, to the part of a hook-and-loop closure having hooks, in the case of a diaper, as what is called a "landing zone." As shown in FIG. 5, the voluminous nonwoven composite SC40 is also used as what is called an "acquisition layer" (12) in a diaper, is therefore disposed between absorbent body 62 and cover nonwoven 58, and is therefore not subject to any mechanical stress.

The voluminous nonwoven composite according to the invention therefore differs fundamentally from a spun-bond nonwoven, in terms of diverse technical properties, and accordingly also from those nonwoven composites composed of endless filaments and staple fibers that are supposed to have the same technical properties as a spun-bond nonwoven, among other things as the result of water-jet needling.

REFERENCE SYMBOL LIST

Is Part of the Specification 10 inline production line
12 nonwoven composite
14 extruder
16 nozzle plate or spinning bar with nozzle package
18 filaments or endless filaments
20 blowing air
22 transport belt
24 spun-bond layer
26 layer of staple fibers 28
28 staple fiber
30 card or carding device
32 water-jet stabilization or water-jet needling
34 drum with relief
36 dryer
38 winder
40 roller
42 offline production line
44 back side of a diaper 46
46 diaper
48 landing zone
50 hook-and-loop tape with hooks
52 relief
54 mountain structure
56 valley structure
58 bale form or fiber bale (pure-type or mixed)
60 bale opener or fiber bale opener (Blendomat)
62 absorbent body
64 embossing points

The invention claimed is:

1. Voluminous nonwoven composite comprising a first layer of melt-spun endless filaments, laid down in entangled manner, and a second layer of crimped staple fibers, wherein
   a) the endless filaments have a fineness of 0.8 to 1.3 dtex,
   b) the crimped staple fibers have a fineness of 2.2 to 15 dtex, and
   c) the layers are stabilized and intimately connected with one another exclusively via water jets, to form the voluminous nonwoven composite.

2. Nonwoven composite according to claim 1, wherein crimped staple fibers have a length of ≥2.5 cm.

3. Nonwoven composite according to claim 1, wherein the density of the nonwoven composite amounts to ≤0.1 g/cm³.

4. Nonwoven composite according to claim 1, wherein the nonwoven composite has pores having a diameter of ≤0.4 mm.

5. Nonwoven composite according to claim 1, wherein it has a weight per surface area of 18 to 80 g/m².

6. Nonwoven composite according to claim 1, wherein it has a relief having discrete raised locations, which are embossed during water-jet stabilization.

7. Nonwoven composite according to claim 1, wherein it has an additional embossing, which are introduced via a thermo-calender and/or an ultrasound calender.

8. Nonwoven composite according to claim 1, wherein the endless filaments and/or the crimped staple fibers are passed to water-jet stabilization in an inline process.

9. Nonwoven composite according to claim 1, wherein the first layer and/or the second layer are pre-stabilized.

10. Nonwoven composite according to claim 9, wherein both the first layer and the second layer are pre-stabilized, are produced separately from one another, and then are passed to water-jet stabilization.

11. Nonwoven composite according to claim 1, wherein the first layer and/or the second layer are passed to water-jet stabilization in an offline process.

12. Nonwoven composite according to claim 1, wherein at least one additional layer of endless filaments and/or staple fibers are passed to water-jet stabilization.

13. Nonwoven composite according to claim 1, wherein the endless filaments comprise monofilaments or bi-component filaments composed of polypropylene, polyethylene, polyester, polyamide, polylactide or their copolymers.

14. Nonwoven composite according to claim 1, wherein the staple fibers comprise viscose or cotton or of monocomponent or bi-component fibers composed of polypropylene, polyethylene, polyester, polyamide, polylactide or their copolymers.

15. Nonwoven composite according to claim 1, wherein the crimped staple fibers have a fineness of 4 to 10 dtex.

16. Voluminous nonwoven composite comprising a first layer of melt-spun endless filaments, laid down in entangled manner, and a second layer of crimped staple fibers, wherein
a) the endless filaments have a fineness of 0.8 to 1.8 dtex,
b) the crimped staple fibers have a fineness of 2.2 to 15 dtex, and
c) the layers are stabilized and intimately connected with one another exclusively via water jets, to form the voluminous nonwoven composite, and
wherein the voluminous nonwoven composite has more than 5 pores per cm² having a diameter of ≥0.2 mm.

17. Voluminous nonwoven composite comprising a first layer of melt-spun endless filaments, laid down in entangled manner, and a second layer of crimped staple fibers, wherein
a) the endless filaments have a fineness of 0.8 to 1.8 dtex,
b) the crimped staple fibers have a fineness of 2.2 to 15 dtex, and
c) the layers are stabilized and intimately connected with one another exclusively via water jets, to form the voluminous nonwoven composite, and
wherein at least some of the endless filaments and/or at least some of the staple fibers have a non-round cross-section and/or are hollow.

18. Voluminous nonwoven composite comprising a first layer of melt-spun endless filaments, laid down in entangled manner, and a second layer of crimped staple fibers, wherein
a) the endless filaments have a fineness of 0.8 to 1.8 dtex,
b) the crimped staple fibers have a fineness of 2.2 to 15 dtex, and
c) the layers are stabilized and intimately connected with one another exclusively via water jets, to form the voluminous nonwoven composite,
wherein the second layer contains not only the one crimped staple fibers but also, in addition, other crimped staple fibers having a fineness from 1.2 to 2.1 dtex, and
wherein the second layer comprises a mixture of 20 to 99 wt.-% of the one staple fibers and 1 to 80 wt.-% of the other staple fibers.

19. Nonwoven composite according to claim 18, wherein the one crimped staple fibers comprise one material, and the other crimped staple fibers comprise a different material from the one crimped staple fibers.

20. Method for the production of a voluminous nonwoven composite, the method comprising steps of:
laying down a first layer of melt-spun endless filaments in entangled manner, the melt-spun endless filaments having a fineness of 0.8 to 1.3 dtex,
applying a second layer of crimped staple fibers to the first layer of the melt-spun endless filaments, the crimped staple fibers having a fineness of 2.2 to 15 dtex, and
water-jet stabilizing the first layer and the second layer so that the crimped staple fibers are intimately connected to the melt-spun endless filaments.

21. Method according to claim 20, wherein the second layer contains not only the one crimped staple fibers but also, in addition, other crimped staple fibers having a fineness from 1.2 to 2.1 dtex, and
wherein the second layer comprises a mixture of 20 to 99 wt.-% of the one staple fibers and 1 to 80 wt.-% of the other staple fibers.

22. Method according to claim 20, further comprising a step of embossing a relief during the water-jet stabilization, the relief having discrete raised locations.

23. Method according to claim 20, further comprising a step of:
carrying out an additional embossing via a thermo-calender and/or an ultrasound calender, after the water-jet stabilization.

24. Method according to claim 20, further comprising a step of passing the endless filaments and/or the crimped staple fibers to the water-jet stabilization in an inline process.

25. Method according to claim 20, wherein the first layer and/or the second layer is pre-stabilized.

26. Method according to claim 20, further comprising a step of passing the first layer and/or the second layer to the water-jet stabilization in an offline process.

27. Method according to claim 25, wherein both the first layer and the second layer are pre-stabilized, are produced separately from one another, and are then passed to the water-jet stabilization.

28. Method according to claim 20, further comprising a step of passing at least one additional layer of endless filaments and/or staple fibers to the water-jet stabilization.

* * * * *